US012784595B2

(12) United States Patent
(10) Patent No.: US 12,784,595 B2
(45) Date of Patent: Nov. 3, 2026

Song et al.

(54) APPARATUS AND METHOD FOR PROCESSING ROAD SITUATION DATA

(71) Applicant: KOREA NATIONAL UNIVERSITY OF TRANSPORTATION INDUSTRY-ACADEMIC COOPERATION FOUNDATION, Chungcheongbuk-do (KR)

(72) Inventors: Seok Il Song, Sejong (KR); Cheol Mun, Chungcheongbuk-do (KR)

(73) Assignee: KOREA NATIONAL UNIVERSITY OF TRANSPORTATION INDUSTRY-ACADEMIC COOPERATION FOUNDATION, Chungcheongbuk-do (KR)

( * ) Notice: Subject to any disclaimer, the term of this patent is extended or adjusted under 35 U.S.C. 154(b) by 310 days.

(21) Appl. No.: 17/563,586

(22) Filed: Dec. 28, 2021

(65) Prior Publication Data

US 2023/0196919 A1 Jun. 22, 2023

(30) Foreign Application Priority Data

Dec. 17, 2021 (KR) ........................ 10-2021-0181610

(51) Int. Cl.
*G08G 1/16* (2006.01)
*G06V 20/54* (2022.01)
(Continued)

(52) U.S. Cl.
CPC ............. *G08G 1/164* (2013.01); *G06V 20/54* (2022.01); *G08G 1/0116* (2013.01); (Continued)

(58) Field of Classification Search
None
See application file for complete search history.

(56) References Cited

U.S. PATENT DOCUMENTS 11,256,241 B1 * 2/2022 Sobalvarro ...... G05B 19/41885
2012/0197911 A1 * 8/2012 Banka .................. G06F 16/951 707/754
(Continued)

FOREIGN PATENT DOCUMENTS

EP 3608893 A1 2/2020
JP 2020109655 A 7/2020
(Continued)

OTHER PUBLICATIONS

English machine translation of KR 102275280 B1 performed by STIC. (Year: 2021).*
(Continued)

*Primary Examiner* — Christopher A Buksa
(74) *Attorney, Agent, or Firm* — Nath, Goldberg & Meyer; Jerald L. Meyer; Stanley N. Protigal

(57) ABSTRACT

The present disclosure relates to an apparatus and a method for processing road situation data. A road situation data processing method according to an exemplary embodiment of the present disclosure is a road situation data processing method which is performed by a processor of an apparatus for processing road situation data including: collecting sensing data on objects on a road from a plurality of sensors provided on the road; modeling a relationship between the objects on a graph based on sensing data on the objects; constructing a grid-based spatial index with respect to the graph modeling result; removing redundant sensing data among sensing data on the objects included in the grid-based spatial index; extracting an object corresponding to a response to a query by performing a predetermined query on the objects from which the redundant sensing data is removed; and outputting context awareness data to the object corresponding to the response to the query.

4 Claims, 9 Drawing Sheets

(51) Int. Cl.
*G08G 1/01* (2006.01)
*G08G 1/017* (2006.01)

(52) U.S. Cl.
CPC ......... *G08G 1/0133* (2013.01); *G08G 1/0141* (2013.01); *G08G 1/0145* (2013.01); *G08G 1/017* (2013.01); *G08G 1/166* (2013.01)

(56) References Cited

U.S. PATENT DOCUMENTS

| | | | | |
|---|---|---|---|---|
| 2016/0323233 | A1* | 11/2016 | Song | H04L 67/52 |
| 2017/0205507 | A1* | 7/2017 | Liu | G01S 13/91 |
| 2017/0327035 | A1* | 11/2017 | Keiser | G08G 1/0133 |
| 2020/0047751 | A1* | 2/2020 | Hwu | B60W 50/14 |
| 2020/0365029 | A1 | 11/2020 | Kourous-Harrigan et al. | |
| 2021/0103029 | A1* | 4/2021 | Liu | G01S 13/931 |
| 2023/0053094 | A1* | 2/2023 | Roberts | B60W 40/08 |

FOREIGN PATENT DOCUMENTS

| | | | |
|---|---|---|---|
| KR | 10-2009-0109312 | A | 10/2009 |
| KR | 101464708 | B1 | 11/2014 |
| KR | 101803891 | B1 | 12/2017 |
| KR | 102192348 | B1 | 12/2020 |
| KR | 102275280 | B1 | 7/2021 |

OTHER PUBLICATIONS

English machine translation of KR 101803891 B1 performed by STIC. (Year: 2017).*

Extended Search Report dated Dec. 5, 2022 issued in corresponding European Application No. 22178376.4.

Office Action issued on May 13, 2024, for application No. KR10-2021-0181610.

Office Action issued on Sep. 25, 2024 for Korean application No. 10-2021-0181610.

Notice of Reasons for Refusal dated Jan. 8, 2026 corresponding to Japanese Patent Application No. 2021-214303.

* cited by examiner

[FIG. 1]
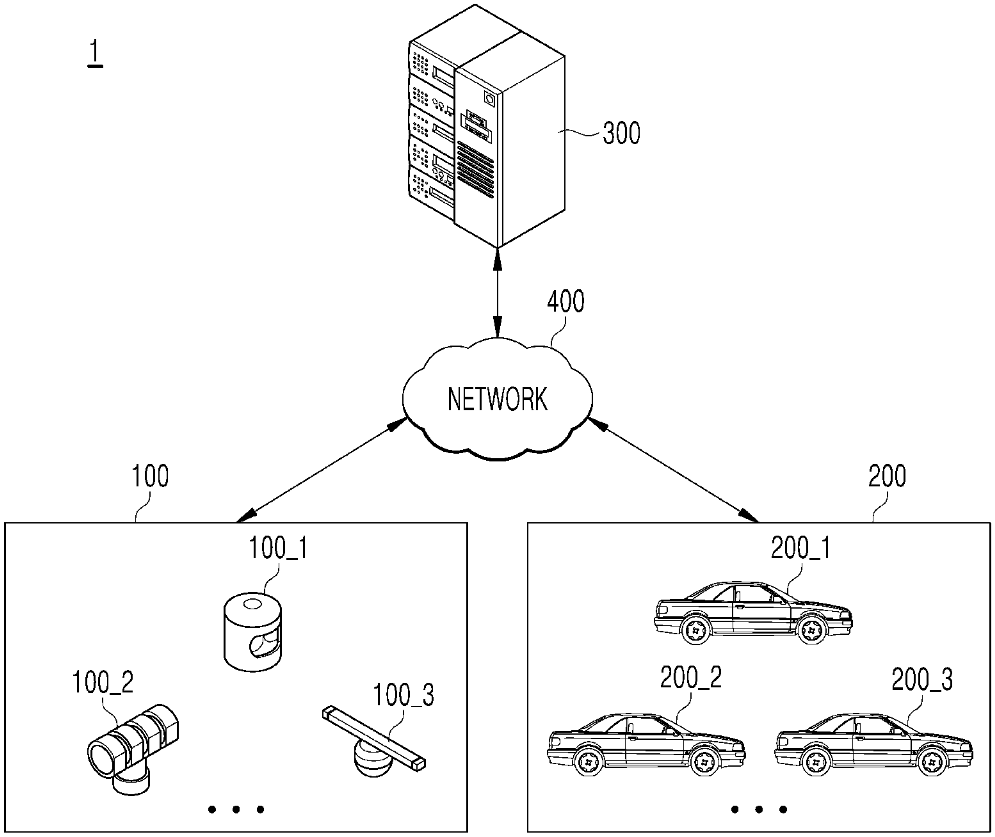

[FIG. 2]
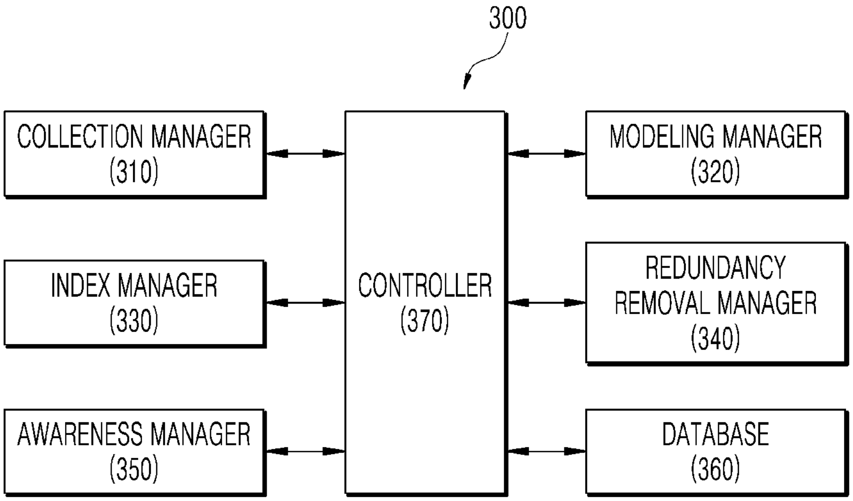
[FIG. 3A]
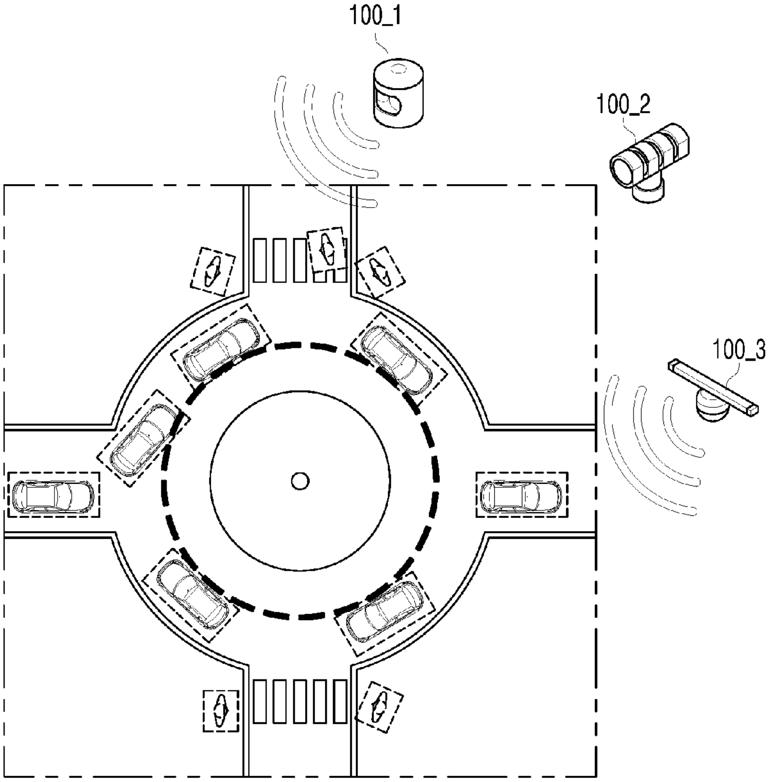

[FIG. 3B]
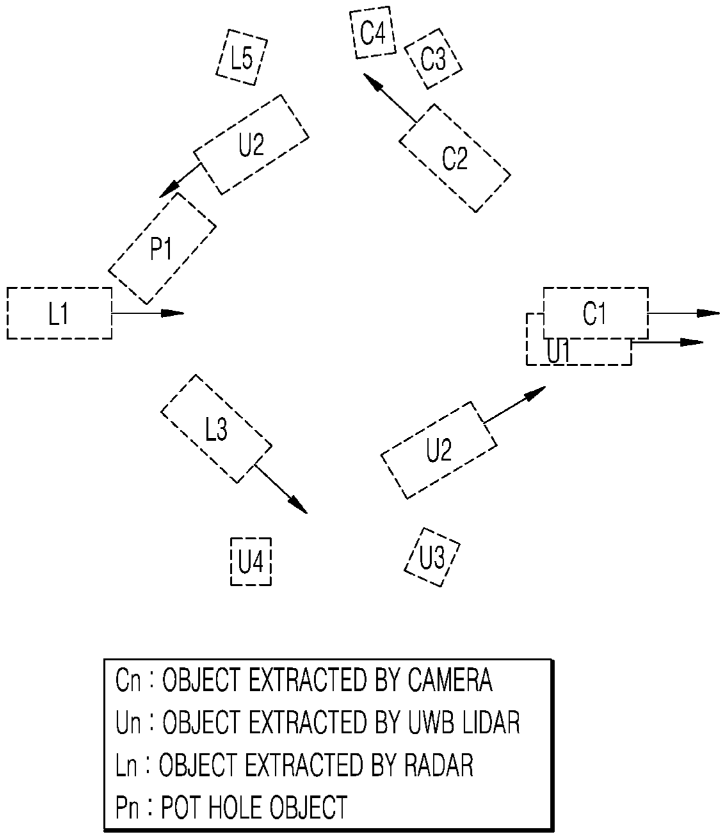

[FIG. 3C]
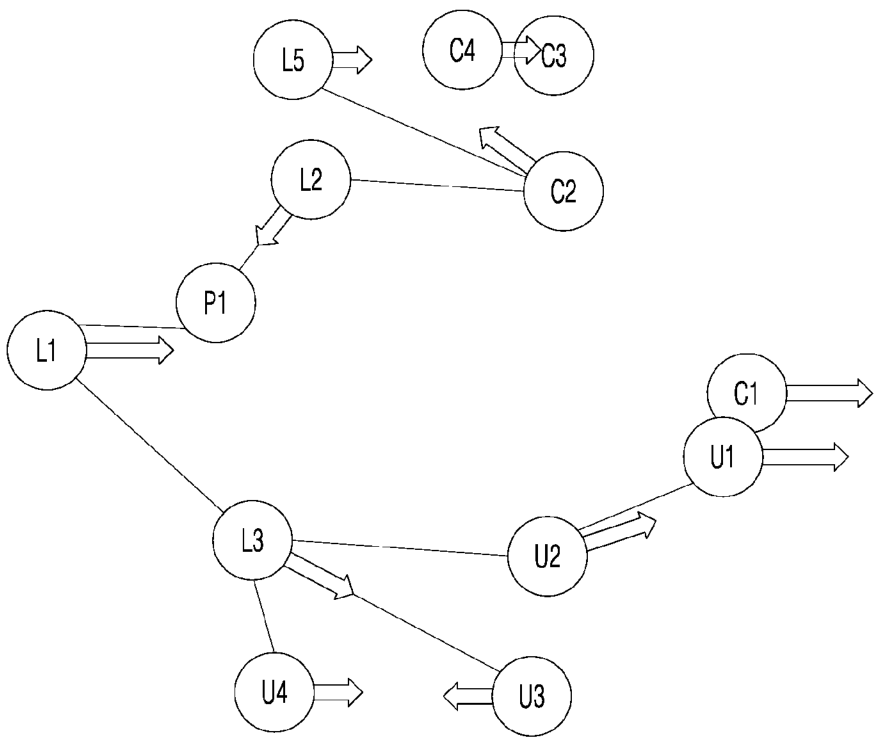

[FIG. 4A]

| ATTRIBUTE | ATTRIBUTE |
|---|---|
| Node ID | - Graphic node identifier |
| Trajectory | - Sensing past five data of objects<br>- List of (location, heading, speed) |
| Sensor Type | - Sensor Type which recognizes object<br>- 0: Camera, 1: Lidar, 2: Radar |
| Location | - Location (x, y) of object |
| Heading | - Heading direction of object |
| Speed | - Moving speed of object |
| AoI | - Age of Information<br>- Context awareness data output time of awareness manager → estimated time of awareness |
| Object Type | - Object Type<br>- 0: Vehicle, 1: Pedestrian, 2: Auto bicycle, 3: Bicycle, 4: Falling object, 5: Pot hole, 6: Construction site |
| MBR | - Object Minimum Bounding Rectangle<br>- (x_left, y_upper, x_right, y_lower) |

[FIG. 4B]

| ATTRIBUTE | ATTRIBUTE |
|---|---|
| Edge ID | - Graph edge identifier |
| TTC | - Time to collision |
| Deadline | - Deadline to inform message<br>- Limit time to necessarily transmit information to node connected with edge by considering AOI and Time to collision |

[FIG. 5A]
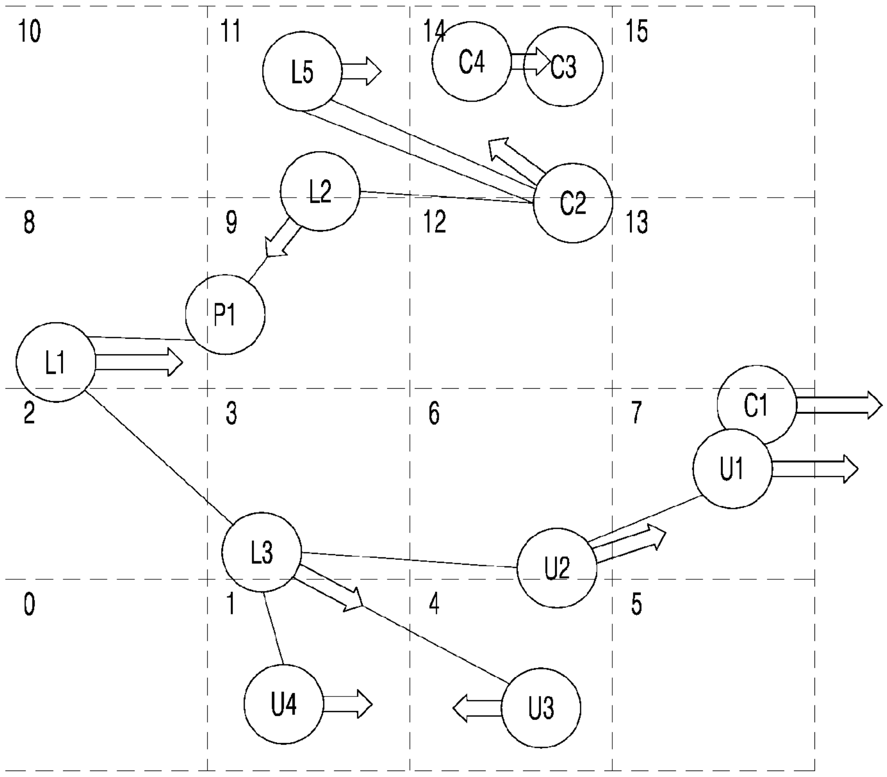

[FIG. 5B]
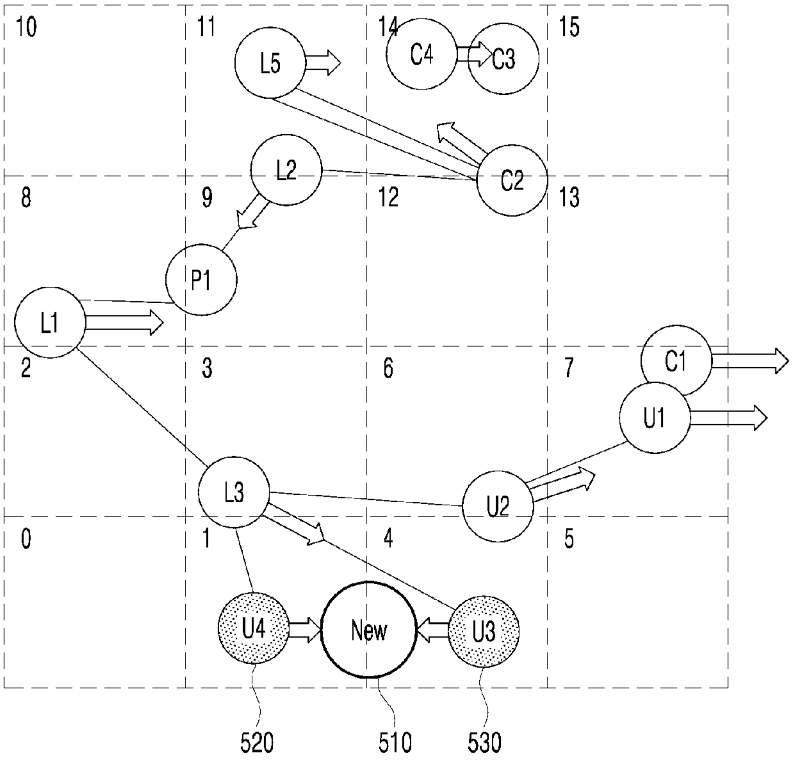
[FIG. 6]
| CELL ID | OBJECT |
|---|---|
| 0 | |
| 1 | U4 |
| 2 | |
| 3 | L3 |
| 4 | U3 |
| 5 | |
| 6 | U2 |
| 7 | U1, C1 |
| | • • • |
| NODE ID | ATTRIBUTE | Adjacent node list (NODE ID, EDGE ATTRIBUTE) |
|---|---|---|
| U4 | Traj., 1, Loc1, H1, S1, AoI, 1, MBR1 | L3 |
| U3 | Traj., 1, Loc2, H2, S2, AoI, 1, MBR2 | L3 |
| P1 | 0, Loc3, AoI, 5, MBR3 | L2 |
| L3 | Traj., 1, Loc4, H4, S4, AoI, 0, MBR4 | L1, U2, U3, U4 |

[FIG. 7]
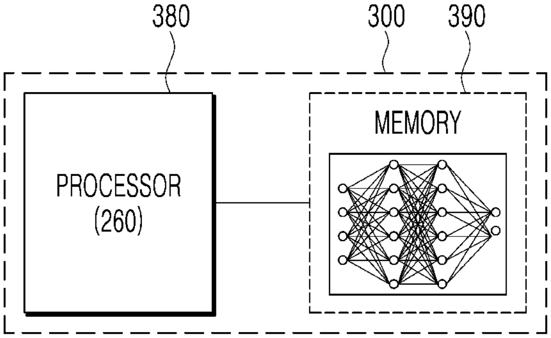
[FIG. 8]
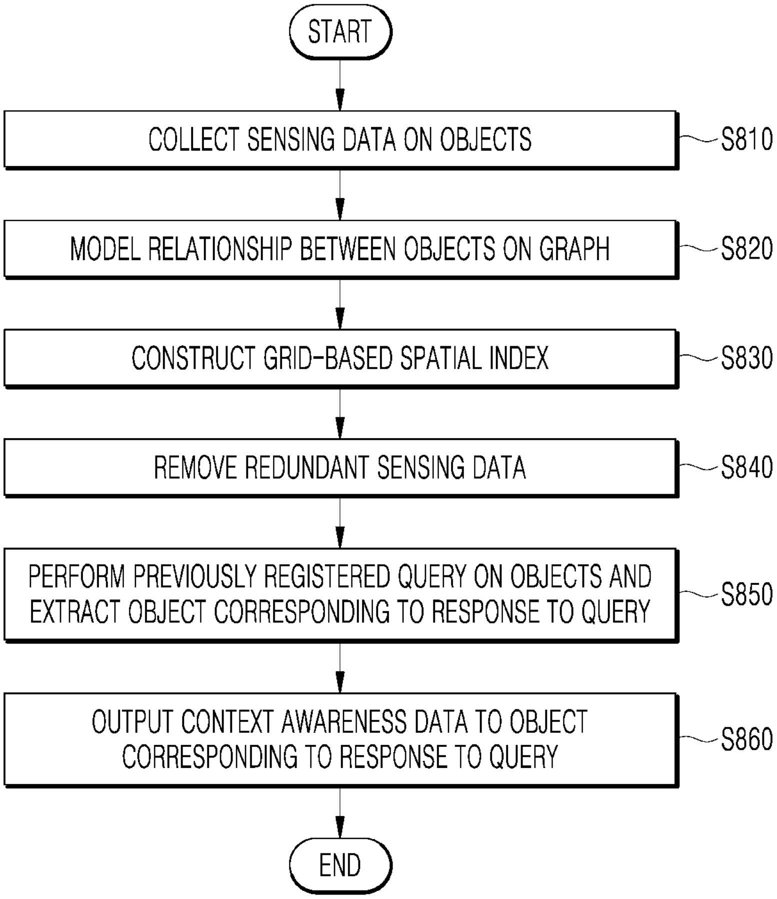

APPARATUS AND METHOD FOR PROCESSING ROAD SITUATION DATA

CROSS-REFERENCE TO RELATED APPLICATION

This present application claims the benefit of priority to Korean Patent Application No. 10-2021-0181610, entitled "APPARATUS AND METHOD FOR PROCESSING ROAD SITUATION DATA," filed on Dec. 17, 2021, in the Korean Intellectual Property Office, the entire disclosure of which is incorporated herein by reference.

FIELD

The present disclosure relates to an apparatus and a method for processing road situation data. The present invention resulted from "Advanced Technology Development for Road Situation Recognition Based on Infra Sensors" of "Self-driving Technology Development Innovation Project" supported by the Ministry of Land, Infrastructure and Transport of South Korea (Project No.: 1615011990).

BACKGROUND

Recently, as studies related to intelligent transportation systems (ITS) have been actively conducted, it contributes to establishing a next-generation traffic information system suitable for an information society. A system which senses speeds of vehicles and traffic information on the road in real time is established to provide information to drivers, which may provide a good effect on the flow of the entire traffic situation.

The above-described background arts are technical information acquired by the inventor for the contents to be disclosed or derived from the contents to be disclosed so that it cannot be referred to as known arts disclosed to the general public prior to the filing of the contents to be disclosed.

RELATED ART DOCUMENT

Patent Document

Patent Document 1: Korean Unexamined Patent Application Publication No. 10-2009-0109312 (published on Oct. 2, 2009)

SUMMARY

An object of the present disclosure is to precisely recognize a situation on the road using data collected from various road infrastructure sensors and help safe driving of the vehicle based thereon.

An object of the present disclosure is to find redundancy of data collected from various road infrastructure sensors and remove unnecessary data to increase a road situation processing speed.

An object of the present disclosure is to provide context awareness data required for each vehicle in real-time by analyzing data collected from various road infrastructure sensors in real-time.

The object to be achieved by the present disclosure is not limited to the above-mentioned objects and other objects and advantages of the present disclosure which have not been mentioned above may be understood by the following description and become more apparent from exemplary embodiments of the present disclosure. Further, it is understood that the objects and advantages of the present disclosure may be embodied by the means and a combination thereof in the claims.

According to an aspect of the present disclosure, a road situation data processing method is a road situation data processing method which is performed by a processor of an apparatus for processing road situation data including: collecting sensing data on objects on a road from a plurality of sensors provided on the road; modeling a relationship between the objects on a graph based on sensing data on the objects; constructing a grid-based spatial index with respect to the graph modeling result; removing redundant sensing data among sensing data on the objects included in the grid-based spatial index; extracting an object corresponding to a response to a query by performing a predetermined query on the objects from which the redundant sensing data is removed; and outputting context awareness data to the object corresponding to the response to the query.

According to another aspect of the present disclosure, a road situation data processing apparatus includes a processor and a memory configured to be operably connected to the processor and store at least one code executed in the processor. The memory stores a code which is executed by the processor to cause the processor to collect sensing data on objects on a road from a plurality of sensors provided on the road, model a relationship between the objects on a graph based on sensing data on the objects, construct a grid-based spatial index with respect to the graph modeling result, remove redundant sensing data among sensing data on the objects included in the grid-based spatial index, extract an object corresponding to a response to a query by performing a predetermined query on the objects from which the redundant sensing data is removed, and output context awareness data to the object corresponding to the response to the query.

In addition, another method and another system for implementing the present disclosure and a computer readable recording medium in which a computer program for executing the method is stored may be further provided.

Other aspects, features, and advantages other than those described above will become apparent from the following drawings, claims, and the detailed description of the present invention.

According to the present disclosure, a situation on the road can be precisely recognized using data collected from various road infrastructure sensors and safe driving of the vehicle can be assisted based thereon.

Further, the redundancy of data collected from various road infrastructure sensors can be grasped and unnecessary data can be removed to increase a road situation processing speed.

Further, context awareness data required for each vehicle is provided in real-time by analyzing data collected from various road infrastructure sensors in real-time to help the safe driving of the vehicle.

The effects of the present disclosure are not limited to those mentioned above, and other effects not mentioned can be clearly understood by those skilled in the art from the following description.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items;

FIG. 1 is an exemplary view of a road situation processing environment including a sensor group, an object group, a road situation data processing apparatus, and a network connecting them according to an exemplary embodiment;

FIG. 2 is a block diagram illustrating to schematically explain a configuration of a road situation data processing apparatus according to an exemplary embodiment;

FIGS. 3A to 3C are exemplary views illustrating to schematically explain a graph modeling process according to an exemplary embodiment;

FIGS. 4A and 4B are tables illustrating attributes of nodes and edges included in a graph model according to an exemplary embodiment;

FIGS. 5A and 5B are exemplary views illustrating to explain removal of redundant sensing data using a graph model and a grid-based spatial index according to an exemplary embodiment;

FIG. 6 is a table illustrating a connection relationship between a graph model and a grid-based spatial index according to an exemplary embodiment;

FIG. 7 is a block diagram illustrating to schematically explain a configuration of a road situation data processing apparatus according to another exemplary embodiment; and FIG. 8 is a flowchart for explaining a road situation data processing method according to an exemplary embodiment.

DETAILED DESCRIPTION

Advantages and characteristics of the present disclosure and a method of achieving the advantages and characteristics will be clear by referring to exemplary embodiments described below in detail together with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The exemplary embodiments disclosed below are provided so that the present disclosure will be thorough and complete, and also to provide a more complete understanding of the scope of the present disclosure to those of ordinary skill in the art. In describing the present invention, when it is determined that a detailed description of related well-known technology may obscure the gist of the present invention, the detailed description thereof will be omitted.

Terms used in the present application are used only to describe specific exemplary embodiments, and are not intended to limit the present invention. A singular form may include a plural form if there is no clearly opposite meaning in the context. In the present application, it should be understood that the term "include" or "have" indicates that a feature, a number, a step, an operation, a component, a part or the combination those of described in the specification is present, but do not exclude a possibility of presence or addition of one or more other features, numbers, steps, operations, components, parts or combinations, in advance. Terminologies such as first or second may be used to describe various components but the components are not limited by the above terminologies. The above terms are used only to distinguish one component from the other component.

Further, in the specification, the term "unit" may be a hardware component such as a processor or a circuit and/or a software component which is executed by a hardware component such as a processor.

Hereinafter, exemplary embodiments according to the present invention will be described in detail with reference to the accompanying drawings, and the same or corresponding constituent elements are denoted by the same reference numerals regardless of a sign of the drawing, and duplicated description thereof will be omitted.

FIG. 1 is an exemplary view of a road situation processing environment 1 according to the exemplary embodiment and the road situation processing environment 1 may include a sensor group 100, an object group 200, a road situation data processing apparatus 300, and a network 400 connecting them.

Referring to FIG. 1, the sensor group 100 is provided on the road to sense objects present on the road to generate sensing data. According to the exemplary embodiment, the sensing data may include one or more of a location of the object, a heading direction of the object, and a moving speed of the object. Here, depending on an object type, the location of the object may be essentially included in the sensing data and the heading direction and the speed may be selectively included.

According to the exemplary embodiment, the sensor group 100 may include a Lidar 100_1, a camera 100_2, and a UWB radar 100_3.

The Lidar 100_1 uses laser beams to sense objects on the road to generate sensing data. The Lidar 100_1 includes an optical transmitter (not illustrated), an optical receiver (not illustrated), and at least one processor (not illustrated) which is electrically connected to the optical transmitter and the optical receiver to process a received signal and generate data on an object based on the processed signal. The Lidar 100_1 may be implemented by a time of flight (TOF) manner or a phase-shift manner. The Lidar 100_1 may detect an object and generate a location of the detected object, a distance to the detected object, a relative velocity, and a heading direction of the object as sensing data, based on the TOF manner or the phase-shift manner.

The camera 100_2 uses an image to sense objects on the road to generate sensing data. The camera 100_2 includes at least one lens, at least one image sensor (not illustrated), and at least one processor (not illustrated) which is electrically connected to the image sensor to process the received signal and generate data on the objects based on the processed signal. The camera 100_2 may be at least any one of a mono camera, a stereo camera, and an around view monitoring (AVM) camera. The camera 100_2 uses various image processing algorithms to generate a location of an object, a distance from the detected object, a relative velocity, and a heading direction of the object as sensing data. For example, the camera 100_2 may generate a location of an object, a distance from the detected object, a relative velocity, and a heading direction of the object from the acquired image based on a change of an object size over time.

The radar 100_3 uses a radio wave to sense objects on the road to generate sensing data. The radar 100_3 may include an electromagnetic wave transmitter (not illustrated), an electromagnetic wave receiver (not illustrated), and at least one processor (not illustrated) which is electrically connected to the electromagnetic wave transmitter and the electromagnetic wave receiver to process a received signal and generate data on an object based on the processed signal. The radar 100_3 may be implemented by a pulse radar manner or a continuous wave radar manner, according to an electromagnetic wave emission principle. The radar 100_3 may be implemented by a frequency modulated continuous wave (FMCW) manner or a frequency shift keying (FSK) manner, according to a signal waveform, in the continuous radar manner. In the meantime, the radar 100_3 may be differently classified depending on a sensing distance. As a long-distance sensing radar, an FM-CW radar is generally used and an RF frequency is 76 GHz, and a sensing distance range is set to 4 m to 120 m. Further, as a short-distance sensing radar, an ultra-wideband (UWB) radar is used and an RF frequency is 24 GHz and a sensing distance range is set to 0.1 m to 20 m. The radar 100_3 may detect objects and generate a location of each of the objects, a distance from the object, a relative velocity, and a heading direction of the object as sensing data, based on a time of flight (TOF) manner or a phase-shift manner, by a medium of the electromagnetic wave.

According to the exemplary embodiment, as the sensor group 100, the Lidar 100_1, the camera 100_2, and the radar 100_3 have been disclosed, but it is not limited thereto so that various sensors such as a sensor (not illustrated) which measures a road condition, a sensor (not illustrated) which measures a visibility range, a road surface sensor (not illustrated), and a sensor (not illustrated) which senses weather may be used.

The object group 200 may communicate with the road situation data processing apparatus 300 via the network 400 and receive context awareness data on the road on which the vehicle is moving, from the road situation data processing apparatus 300. According to the exemplary embodiment, the object group 200 may include vehicles, pedestrians, auto bicycles, bicycles, falling objects, pot holes, and construction sites. In the exemplary embodiment, for the convenience of description, the object is described by limiting it to a vehicle. Accordingly, the object group 200 may include a vehicle group 200_1 to 200_N as illustrated in FIG. 1. Further, according to the exemplary embodiment, terms of an object group, a vehicle group, vehicles, pedestrians, auto bicycles, bicycles, falling objects, pot holes, and construction sites may be used as the meaning of objects.

The road situation data processing apparatus 300 processes sensing data collected from the sensor group 100 to accurately recognize the situation of the road and help the object group 200 to safely drive the vehicle based thereon.

The road situation data processing apparatus 300 may model the relationship between objects on a graph based on the sensing data on the objects. The road situation data processing apparatus 300 may construct a grid-based spatial index on the graph modeling result. The road situation data processing apparatus 300 may remove redundant sensing data among sensing data on the objects included in the grid-based spatial index. The road situation data processing apparatus 300 performs a previously registered query on objects from which the redundant sensing data is removed to extract an object corresponding to a response to the query. The road situation data processing apparatus 300 may output context awareness data to the object corresponding to the response to the query.

The network 400 may serve to connect the sensor group 100, the object group 200, and the road situation data processing apparatus 300. The network 400 may include wired networks such as local area networks (LANs), wide area networks (WANs), metropolitan area networks (MANs), and integrated service digital networks (ISDNs) and wireless networks such as wireless LANs, CDMA, Bluetooth, and satellite communication, but the scope of the present disclosure is not limited thereto. Also, the network 400 may transmit or receive information using short-range communication and/or long-range communication. Here, the short-range communication may include Bluetooth, radio frequency identification (RFID), infrared data association (IrDA), ultra-wideband (UWB), Zigbee, and wireless fidelity (Wi-Fi) techniques and the long distance communication may include code division multiple access (CDMA), frequency division multiple access (FDMA), time division multiple access (TDMA), orthogonal frequency division multiple access (OFDMA), single carrier frequency division multiple access (SC-FDMA) techniques.

The network 400 may include connection of network elements such as a hub, a bridge, a router, and a switch. The network 400 may include one or more connected networks, for example, a multi-network environment including a public network such as the Internet and a private network such as a secure corporate private network. Access to the network 400 may be provided through one or more wired or wireless access networks.

Moreover, the network 400 may support controller area network (CAN) communication, vehicle to everything (V2X) communication, wireless access in vehicular environment (WAVE) communication techniques and an internet of things (IoT) network and/or 5G communication which exchange between distributed components such as objects to process. Here, the V2X communication may include communication between vehicles and all entities such as vehicle-to-vehicle (V2V) referring to communication between vehicles, vehicle to infrastructure (V2I) referring to communication between vehicles and eNB or RSU (road side unit), vehicle-to-pedestrian (V2P) referring to communication between vehicles and a UE possessed by an individual (for example, a pedestrian, a bicycle rider, a vehicle driver, or a passenger), and vehicle-to-network (V2N).

FIG. 2 is a block diagram illustrating to schematically explain a configuration of a road situation data processing apparatus according to an exemplary embodiment, FIGS. 3A to 3C are exemplary views illustrating to schematically explain a graph modeling process according to an exemplary embodiment, FIGS. 4A and 4B are tables illustrating attributes of nodes and edges included in a graph model according to an exemplary embodiment, FIGS. 5A and 5B are exemplary views illustrating to explain removal of redundant sensing data using a spatial index based on a graph model and a grid according to an exemplary embodiment, and FIG. 6 is a table illustrating a connection relationship between a graph model and a grid-based spatial index according to an exemplary embodiment. In the following description, a duplicated part of the description of FIG. 1 will be omitted.

Referring to FIGS. 2 to 6, the road situation data processing apparatus 300 may include a collection manager 310, a modeling manager 320, an index manager 330, a redundancy removal manager 340, an awareness manager 350, a database 360, and a controller 370.

The collection manager 310 may collect sensing data on the object group 200 on the road from the sensor group 100 provided on the road. According to the exemplary embodiment, the sensing data may include one or more of a location of the object group 200, a heading direction of the object, and a moving speed of the object. Hereinafter, for the convenience of description, the sensor group 100 is denoted as a sensor and the object group 200 is denoted as an object.

The collection manager 310 may store and manage new registration/removal/specification change of a sensor on the road, a type of each sensor, and a data format in the database 360. The collection manager 310 may serve to identify which sensor transmits the collected sensing data and map the collected sensing data with a standard sensor data format. To this end, the collection manager 310 may read a data format for the corresponding sensor from the database 360 and convert actually collected sensing data into a standard sensor data format. The collection manager 310 may store the standard sensor data format in the database 360 in real-time and link the standard sensor data format to a higher level (for example, the modeling manager 320 or the index manager 330).

The modeling manager 320 may model the relationship between objects on a graph based on the sensing data on the objects. At the time of graph modeling, the modeling manager 320 may represent each of the objects as any node on the graph. Further, since a node corresponding to any one object among the objects may affect nodes corresponding to one or more other objects, a relationship is set and the set relationship may be represented with an edge.

When the set relationship is represented with the edge, the modeling manager 320 may determine whether there is a collision possibility with nodes corresponding to one or more other objects based on a location, a heading direction, and a speed of a node corresponding to any one object among the objects. As there is a collision possibility, the modeling manager 320 may represent an edge between the node corresponding to any one object and the nodes corresponding to one or more other objects.

A graph modeling process according to the exemplary embodiment will be described with reference to FIGS. 3A to 3C. The modeling manager 320 may set a relationship between objects based on sensing data including one or more of the location of the object, the heading direction of the object, and the moving speed of the object collected from the collection manager 310 and model the relationship on a graph as illustrated in FIG. 3C.

FIG. 3A shows that a Lidar 100_1, a camera 100_2, and a radar 100_3 are installed on a roundabout according to the exemplary embodiment and various objects (for example, a pedestrian, a vehicle, and a pot hole) are located on the road.

FIG. 3B shows that sensing data collected from the Lidar 100_1, the camera 100_2, and the radar 100_3 are represented on a map. Here, L1 to L5 may denote object 1 to object 5 sensed by the Lidar 100_1. C1 to C4 may denote objects 1 to 5 sensed by the camera 100_2. U1 to u4 may denote objects 1 to 4 sensed by the radar 100_3. P1 may denote pot hole 1 on the road. Further, in FIG. 3B, an arrow may indicate a heading direction and a moving speed of each object.

According to the exemplary embodiment, at least three sensors are located on the road so that sensors may generate different sensing data for the same object. That is, the sensing data generated by the sensors may be duplicated for the same object.

The modeling manager 320 may set and represent each object as a node of a graph at the time of graph modeling and set and represent the relationship between objects with an edge. All objects are represented as nodes on the graph and the relationship between objects may be set only when one object is likely to affect the other object. To this end, the modeling manager 320 may calculate a collision possibility (for example, an expected collision time or an expected approaching time) based on the speed, the heading direction, and the location at the present time. As long as the collision possibility is not infinite, the modeling manager 320 may establish the relationship for all and periodically update the relationship.

In FIG. 3B, as seen from the heading direction and the speed of C2, there is no collision possibility with C4 or C3. However, there is a collision possibility with L5 as seen from the heading direction and the speed of C2 and in this case, an edge may be set between C2 and L5. Further, the modeling manager 320 records an expected collision time of C2 and L5 as an edge attribute and whenever the locations of C2 and L5 are updated, the edge attribute may be correspondingly updated.

FIG. 4A is a table representing attributes of nodes in a graph model and FIG. 4B is a table representing attributes of edges in a graph model.

Referring to FIG. 4A, a node ID may indicate a graph node identifier. A trajectory indicates trajectory data obtained by sensing a location, a heading direction, and a speed of past five objects with a time interval unit (for example, 0.1 seconds). A sensor type may indicate a type of sensor which senses an object and 0 indicates a camera, 1 indicates a Lidar, and 2 indicates a radar. Location may indicate a position (x, y) of the object. Heading may indicate a moving direction of the object. Speed may indicate a moving speed of the object. AoI is an age of information and may indicate a difference between a context awareness data output time and awareness performance estimation time of the awareness manager 350. In the exemplary embodiment, the time difference may be used as an important basis to determine validity of arbitrary data. An object type is a type of an object and 0 indicates a vehicle, 1 may indicate a pedestrian, 2 may indicate an auto-bicycle, 3 may indicate a bicycle, 4 may indicate a falling object, 5 may indicate a pot hole, and 6 may indicate a construction site. Here, in the case of static objects such as the falling object, the pot hole, and the construction site, there is no heading speed and moving direction. MBR is a minimum bounding rectangle of an object and may include four coordinate values (x_left, y_upper, x_right, and y_lower).

Referring to FIG. 4B, the edge ID may represent a graph edge identifier. TTC may indicate an expected time to collide. Deadline is a deadline to inform message and may indicate a limit time to necessarily transmit information to a node connected with an edge in consideration of the AOI and the expected time to collision.

Returning to FIG. 2, the index manager 330 may construct a grid-based spatial index for the graph modeling result generated by the modeling manager 320. FIG. 5A illustrates a result of constructing a grid-based spatial index for the graph modeling result of FIG. 3C. In the exemplary embodiment, the grid-based spatial index is configured by 16 cells and the number of cells may vary.

In the exemplary embodiment, the index manager 330 may determine a size of the cell which configures the grid-based spatial index based on a sensing error for each of the plurality of sensors and a speed limit set on the road. Specifically, the smaller the sensing error and the lower the speed limit, the smaller the size of one cell. It is possible to determine whether an object is precisely located in any one cell by constructing the grid-based spatial index, so that it is understood that even though the cell size is reduced, the collision risk is reduced. The reason for determining the cell size as described above in the exemplary embodiment is that when only the objects included in a specific cell and cells adjacent to the specific cell are considered, all objects which are candidates to be removed due to redundancy are compared.

The redundancy removal manager 340 may remove redundant sensing data among sensing data on the objects included in the grid-based spatial index.

The redundancy removal manager 340 may set one or more existing objects as a redundant object candidate by comparing location data of a new object sensed in any one cell among a plurality of cells which configures the grid-based spatial index and location data of one or more existing objects included in the above-mentioned any one cell and cells adjacent to the above-mentioned any one cell.

According to the exemplary embodiment, when the redundant object candidate is set, the redundancy removal manager 340 may detect a first cell in which a new object is located, among a plurality of cells which configures a grid-based spatial index, based on sensing data for a new object. Next, the redundancy removal manager 340 may detect locations of one or more existing objects located in the first cell and cells adjacent to the first cell. Next, the redundancy removal manager 340 may calculate a difference value between location data of the new object in the first cell and location data of one or more existing objects included in the first cell and cells adjacent to the first call, as a first distance value. Here, the first distance value may refer to a physical distance value between actual objects. The redundancy removal manager 340 may set one or more existing objects having a first distance value which is equal to or lower than a first threshold value as a redundant object candidate.

As another exemplary embodiment, when the redundant object candidate is set, the redundancy removal manager 340 may determine a first spot where a new object is located, based on sensing data for the new object. The redundancy removal manager 340 may detect a location of one or more existing objects located within a predetermined distance from the first spot. The redundancy removal manager 340 may calculate a difference value between location data of the new object and location data of one or more existing objects located within a predetermined distance from the first spot as a first distance value. Here, the first distance value may refer to a physical distance value between actual objects. The redundancy removal manager 340 may set one or more existing objects having a first distance value which is equal to or lower than the first threshold value as redundant object candidates.

The redundancy removal manager 340 compares trajectory data of the redundant object candidate and trajectory data of a new object to determine the redundant object candidate as a final redundant object.

When the final redundant object is determined, the redundancy removal manager 340 may extract a first point group located in a predetermined time zone on a three-dimensional coordinate system with a location, a heading direction, and a speed included in sensing data of the redundant object candidate as axes. The redundancy removal manager 340 may extract a second point group located in a predetermined time zone on a three-dimensional coordinate system with a location, a heading direction, and a speed included in sensing data of the new candidate as axes.

The redundancy removal manager 340 may calculate a difference value between the first point group and the second point group as a second distance value. Here, the second distance value may be a distance value which represents a similarity between data, rather than an actual physical distance. According to the exemplary embodiment, in order to calculate the difference value, the difference data may be calculated by matching data of the first point group and data of the second point group at the same timing. The data of the first point group and the second point group may include five data before a timing t at which the location data of the new object and the redundant candidate object is confirmed. For example, when the measurement is performed at every 0.1 seconds, the data may be trajectory data at t−0.1, t−0.2, t−0.3, t−0.4, and t−0.5. The first point group and the second point group may be data in the same coordinate system. The redundancy removal manager 340 may determine one or more redundant object candidates having a second distance value which is equal to or lower than the second threshold value as final redundant objects.

The redundancy removal manager 340 may remove one of sensing data for the final redundant object and sensing data for the new object.

According to the exemplary embodiment, the objects may have an error for location depending on a type of the sensor so that when different sensors sense the same object, the object may be recognized as different objects. When the same object is recognized as different objects, unnecessary data redundancy or context awareness error may occur so that the redundancy needs to be removed. In order to quickly remove the redundancy, an existing object which is in the most similar location to the new object needs to be quickly searched. When the objects are sequentially compared, the speed is lowered so that it is not possible.

In order to quickly remove the redundancy, the grid-based spatial index constructed by the index manager 330 may be used. That is, the similarity to the existing objects in the cell may be compared by calculating a cell in the grid-based spatial index in which a location of the new object is included.

Referring to FIG. 5B, a cell in which a new object 510 (New) is located is cells 1 and 4 and in the cells 1 and 4, the existing objects U4 (520) and U3 (530) are located. Here, a first distance value which is a difference value between the location data of the new object 510 and the location data of the existing objects U4 (520) and U3 (530) is equal to or lower than the first threshold value, so that the existing objects U4 (520) and U3 (530) may be set as redundant object candidates. Here, the first distance value may refer to a physical distance value between actual objects. Thereafter, a difference value between trajectory data (the first point group) of the new object 510 and trajectory data (the second point group) of the existing objects U4 (520) and U3 (530) may be calculated as a second distance value. The second distance value may be a distance value which represents a similarity between data, rather than an actual physical distance. One or more of existing objects U4 (520) and U3 (530) having a second distance value which is equal to or lower than the second threshold value may be determined as final redundant objects.

In order to compare the similarities to access objects included in each cell in the grid-based spatial index, it may access with a structure as represented in the table of FIG. 6. FIG. 6 is a table illustrating a connection relationship between a graph model and a grid-based spatial index according to an exemplary embodiment. IDs of objects included in any one cell are stored in the grid-based spatial index and a node attribute for the corresponding object and an adjacent node list may be quickly grasped from the graph structure corresponding to the object ID.

The awareness manager 350 may perform a previously registered query on objects from which the redundant sensing data is removed to extract an object corresponding to a response to the query. The awareness manager 350 may perform an query for identifying whether there is an object having a collision possibility which is equal to or higher than a threshold value, with respect to objects for which sensing data is updated in the unit of predetermined time (for example, 0.1 seconds). The awareness manager 350 may extract an object having a collision possibility which is equal to or higher than the threshold value as an object corresponding to the response to the query, as a result of the query.

The awareness manager 350 may output context awareness data to an object corresponding to the response to the query. The awareness manager 350 may output warning data warning that there is a collision possibility to an object corresponding to the response to the query.

According to the exemplary embodiment, whenever the new object is recognized in real-time, in the graph model, attributes of the nodes and the edges of the graph may be updated. At this time, the awareness manager 350 may extract the context awareness result of the road through a simple query for the graph.

Here, as a query, a query for finding a node having an expected collision time with the adjacent node which is equal to or shorter than a reference value 1 may be included. This query may be a query for finding an arbitrary node having a collision risk which is equal to or higher than the reference value 1. Further, the query may include a query for finding a node adjacent to an adjacent node of a node having an expected collision time with the adjacent node which is equal to or shorter than a reference value 1. This query may be a query for finding an adjacent node of an arbitrary node having a collision risk which is equal to or higher than the reference value 1. According to the exemplary embodiment, for the convenience of description, even though two query examples have been described, various queries may be registered in the database 360.

A risk factor may be searched by a graph query as described above and when the above-described query is consistently performed, the context awareness data can be extracted so that a continuous query processing technique may be applied. According to the continuous query processing technique, when a query is registered in the database 360, whenever a new object is recognized, it is checked whether there is an object corresponding to a response to the query and when there is a corresponding object, the context awareness data may be immediately output to the object.

The database 360 may store overall data which is collected, processed, generated, and output in the road situation data processing apparatus 300. According to the exemplary embodiment, in the database 360, sensing data collected from the plurality of sensors at a predetermined period may be stored, a graph modeling result may be stored, an update result of attributes of the nodes and the edges may be stored, a grid-based spatial index constructing result may be stored, a detecting result and a removing result of the redundant sensing data may be stored, various queries may be stored, and the context awareness data output result may be stored.

The controller 370 is a sort of central processing unit and may control an overall operation of the road situation data processing apparatus 300. The controller 370 may include any types of devices which are capable of processing data such as a processor. Here, a processor may refer to a data processing unit embedded in hardware which has a physically configured circuit to perform a function expressed by a code or an instruction included in a program. Examples of the data processing units built in a hardware include, but are not limited to, processing units such as a microprocessor, a central processing unit (CPU), a processor core, a multiprocessor, an application-specific integrated circuit (ASIC), a field programmable gate array (FPGA), and the like.

FIG. 7 is a block diagram illustrating to schematically explain a configuration of a road situation data processing apparatus according to another exemplary embodiment. In the following description, a description of the duplicated parts of the description with reference to FIGS. 1 to 6 will be omitted. Referring to FIG. 7, a road situation data processing apparatus 300 according to another exemplary embodiment may include a processor 380 and a memory 390.

According to the exemplary embodiment, the processor 380 may process functions performed by the collection manager 310, the modeling manager 320, the index manager 330, the redundancy removal manager 340, the awareness manager 350, the database 360, and the controller 370 disclosed in FIG. 2.

The processor 380 may control an overall operation of the road situation data processing apparatus 300. Here, a processor may refer to a data processing unit embedded in hardware which has a physically configured circuit to perform a function expressed by a code or an instruction included in a program. Examples of the data processing units built in a hardware include, but are not limited to, processing units such as a microprocessor, a central processing unit (CPU), a processor core, a multiprocessor, an application-specific integrated circuit (ASIC), a field programmable gate array (FPGA), and the like.

The memory 390 is operably connected to the processor 380 and may store at least one code in association with an operation performed in the processor 380.

Further, the memory 390 may perform a function of temporarily or permanently storing data processed by the processor 380. Here, the memory 390 may include a magnetic storage medium or a flash storage medium, but the scope of the present disclosure is not limited thereto. The memory 390 may include an embedded memory and/or an external memory and also include a volatile memory such as a DRAM, an SRAM, or an SDRAM, a non-volatile memory such as a one time programmable ROM (OTPROM), a PROM, an EPROM, an EEPROM, a mask ROM, a flash ROM, an NAND flash memory, or an NOR flash memory, a flash drive such as an SSD, a compact flash (CF) card, an SD card, a micro-SD card, a mini-SD card, an Xd card, or a memory stick, or a storage device such as an HDD.

FIG. 8 is a flowchart for explaining a road situation data processing method according to an exemplary embodiment. In the following description, a description of the duplicated parts of the description with reference to FIGS. 1 to 7 will be omitted.

Referring to FIG. 8, in step S810, the road situation data processing apparatus 300 may collect sensing data for objects on the road from a plurality of sensors provided on the road.

In step S820, the road situation data processing apparatus 300 may model the relationship between objects on a graph based on the sensing data on the objects.

The road situation data processing apparatus 300 may represent each of the objects on the graph as one node. Further, since a node corresponding to any one object among the objects may affect a node corresponding to one or more other objects, the road situation data processing apparatus 300 sets a relationship and may represent the relationship with an edge.

According to the exemplary embodiment, when the relationship is represented with the edge, the road situation data processing apparatus 300 may determine whether there is a collision possibility with a node corresponding to one or more other objects based on a location, a heading direction, and a speed of a node corresponding to any one object among the objects. As there is a collision possibility, the road situation data processing apparatus 300 may represent an edge between a node corresponding to any one object and a node corresponding to one or more other objects.

In step S830, the road situation data processing apparatus 300 may construct a grid-based spatial index on the graph modeling result. When the grid-based spatial index is constructed, the road situation data processing apparatus 300 may determine a size of a cell which configures the grid-based spatial index based on sensing error for each of the plurality of sensors and a speed limit set on the road. Here, the smaller the sensing error and the lower the speed limit, the smaller the size of a cell.

In step S840, the road situation data processing apparatus 300 may remove redundant sensing data among sensing data on the objects included in the grid-based spatial index.

The road situation data processing apparatus 300 may set one or more existing objects as a redundant object candidate by comparing location data of a new object sensed in any one cell among a plurality of cells which configures the grid-based spatial index and location data of one or more existing objects included in the above-described any one cell and cells adjacent to the above-described any one cell.

According to the exemplary embodiment, when the redundant object candidate is set, the road situation data processing apparatus 300 may detect a first cell in which a new object is located, among a plurality of cells which configures a grid-based spatial index, based on sensing data for a new object. The road situation data processing apparatus 300 may detect a location of one or more existing objects located in the first cell. The road situation data processing apparatus 300 may calculate a difference value between location data of the new object in the first cell and location data of one or more existing objects included in the first cell and cells adjacent to the first call, as a first distance value. The road situation data processing apparatus 300 may set one or more existing objects having a first distance value which is equal to or lower than the first threshold value as redundant object candidates.

As another exemplary embodiment, when the redundant object candidate is set, the road situation data processing apparatus 300 may determine a first spot where a new object is located, based on sensing data for the new object. The road situation data processing apparatus 300 may detect a location of one or more existing objects located within a predetermined distance from the first spot. The road situation data processing apparatus 300 may calculate a difference value between location data of the new object and location data of one or more existing objects located within a predetermined distance from the first spot as a first distance value. The road situation data processing apparatus 300 may set one or more existing objects having a first distance value which is equal to or lower than the first threshold value as a redundant object candidate.

The road situation data processing apparatus 300 compares trajectory data of the redundant object candidate and trajectory data of a new object to determine the redundant object candidate as a final redundant object. The road situation data processing apparatus 300 may extract a first point group located in a predetermined time zone on a three-dimensional coordinate system with a location, a heading direction, and a speed included in sensing data of the redundant object candidate as axes. The road situation data processing apparatus 300 may extract a second point group located in a predetermined time zone on a three-dimensional coordinate system with a location, a heading direction, and a speed included in sensing data of a new candidate as axes. The road situation data processing apparatus 300 may calculate a difference value between the first point group and the second point group as a second distance value. The road situation data processing apparatus 300 may determine one or more redundant object candidates having a second distance value which is equal to or lower than the second threshold value as final redundant objects.

The road situation data processing apparatus 300 may remove one of sensing data for the final redundant object and sensing data for the new object.

In step S850, the road situation data processing apparatus 300 performs a previously registered query on objects from which the redundant sensing data is removed to extract an object corresponding to a response to the query.

When an object corresponding to the response to the query is extracted, the road situation data processing apparatus 300 may perform continuous queries identifying whether there is an object having a collision possibility which is equal to or higher than a threshold value, with respect to objects for which sensing data is updated in the unit of predetermined time. As the result of continuous queries, the road situation data processing apparatus 300 considers an object having a collision possibility which is equal to or higher than a threshold value as an object corresponding to the response to the query to output context awareness data.

In step S860, the road situation data processing apparatus 300 may output context awareness data to the object corresponding to the response to the query. Here, the road situation data processing apparatus 300 may output warning data warning that there is a collision possibility to the object corresponding to the response to the query.

The above-described embodiments of the present disclosure may be implemented in the form of a computer program which can be executed by various components on a computer and the computer program may be recorded in computer readable media. At this time, examples of the computer readable medium may include magnetic media such as hard disks, floppy disks and magnetic tapes, optical media such as CD-ROMs and DVDs, magneto-optical media such as floptical disks, or hardware devices such as ROMs, RAMs, and flash memories specifically configured to store and execute program instructions.

The computer program may be specifically designed or constructed for the present invention or known to those skilled in the art of a computer software to be used. Examples of computer program include not only a machine language code which is created by a compiler but also a high level language code which may be executed by a computer using an interpreter.

In the specification (specifically, claims) of the present disclosure, the terminology "said" and a similar terminology may correspond to both the singular form and the plural form. In addition, when a range is described in the present disclosure, individual values constituting the range are described in the detailed description of the present invention as including the invention to which the individual values within the range are applied (unless the context clearly indicates otherwise).

The method steps, processes, and operations described herein are not to be construed as necessarily requiring their performance in the particular order discussed or illustrated, unless specifically identified as an order of performance. It is also to be understood that additional or alternative steps may be employed. In the present disclosure, all examples or exemplary terms (for example, and the like) are simply used to describe the present disclosure in detail so that if it is not limited by the claims, the scope of the present disclosure is not limited by the examples or the exemplary terms. Further, those skilled in the art can appreciate that various modifications, combinations, and changes can be made in accordance with the design conditions and factors within the scope of the appended claims or equivalents thereof.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. A road situation data processing method which is performed by a processor of an apparatus for processing road situation data, the method comprising:

receiving, by the processor, sensing data on objects on a road from a plurality of sensors provided on the road;

representing, by the processor, a relationship between the objects on a graph based on the sensing data on the objects;

determining, by the processor, a grid-based spatial index, the grid-based spatial index represented with respect to the relationship between the objects on the graph that have been represented;

removing, by the processor, redundant sensing data among the sensing data on the objects included in the grid-based spatial index;

determining, by the processor, an object among the objects corresponding to a response to a predetermined query by performing the predetermined query on the objects from which the redundant sensing data is removed, wherein the determining the grid-based spatial index includes determining a size of a cell which configures the grid-based spatial index based on a sensing error for each of the plurality of sensors and a speed limit set on the road, and wherein the sensing error and the speed limit are directly proportional to the size of the cell; and outputting, by the processor, context awareness data to the object corresponding to the response to the predetermined query, wherein the graph representing the relationship between the objects on the graph includes:

representing each of the objects on the graph as any one node; and setting a relationship between nodes based on whether a node corresponding to any one object among the objects affects a node corresponding to one or more other objects among the objects, and representing the relationship between the nodes with an edge, and wherein a plurality of attributes of the edge includes an edge ID that represents a graph edge identifier, a time to collision (TTC) that indicates an expected time to collide, or a deadline that indicates a time limit to necessarily transmit the context awareness data to a node connected with the edge based on the TTC, wherein the removing the redundant sensing data includes:

setting, by the processor, one or more previously sensed objects among the objects as a redundant object candidate by comparing second location data among the sensing data from the plurality of sensors of a newly sensed object among the objects in any one cell among a plurality of cells which configures the grid-based spatial index and first location data among the sensing data from the plurality of sensors of the one or more previously sensed objects among the objects included in the any one cell and cells adjacent to the any one cell;

determining, by the processor, the redundant object candidate as a final redundant object by comparing first trajectory data among the sensing data of the redundant object candidate and second trajectory data among the sensing data of the newly sensed object among the objects; and removing, by the processor, one of the sensing data of the final redundant object and the sensing data from the plurality of sensors of the newly sensed object among the objects, wherein the setting of one or more previously sensed objects among the objects as the redundant object candidate includes:

detecting a first cell in which the newly sensed object among the objects is located, among the plurality of cells which configures the grid-based spatial index, based on the sensing data of the newly sensed object among the objects;

detecting the first location data of the one or more previously sensed objects among the objects located in the first cell;

calculating a difference value between the second location data of the newly sensed object among the objects existing in the first cell and the first location data of the one or more previously sensed objects among the objects included in the first cell or a cell adjacent to the first cell as a first distance value; and setting the one or more previously sensed objects among the objects having the first distance value which is equal to or lower than a first threshold value as the redundant object candidate, wherein the determining of the redundant object candidate as the final redundant object includes:

extracting a first point group located in a three-dimensional coordinate system with a first location among the sensing data, a first heading direction among the sensing data, and a first speed among the sensing data included in the sensing data of the redundant object candidate as axes during a predetermined time;

extracting a second point group located in the three-dimensional coordinate system with a second location among the sensing data, a second heading direction among the sensing data, and a second speed included in the sensing data of the newly sensed object among the objects as axes during the predetermined time;

calculating a difference value between the first point group and the second point group as a second distance value; and determining the redundant object candidate having the second distance value which is equal to or lower than a second threshold value as the final redundant object, wherein the extracting of the object among the objects corresponding to the response to the predetermined query includes:

performing continuous queries identifying whether there is a first object among the objects having a collision possibility which is equal to or higher than a threshold value, with respect to objects for which the sensing data is updated in a predetermined unit of time; and determining the first object among the objects having the collision possibility which is equal to or higher than the threshold value as the object among the objects which corresponds to the response to the predetermined query as the result of the continuous queries, wherein the extracting of the object among the objects corresponding to the response to the predetermined query includes:

performing continuous queries identifying whether there is a first object among the objects having a collision possibility which is equal to or higher than a threshold value, with respect to objects for which the sensing data is updated in a predetermined unit of time; and determining the first object among the objects having the collision possibility which is equal to or higher than the threshold value as the object among the objects which corresponds to the response to the predetermined query as the result of the continuous queries;

and wherein the outputting of the context awareness data includes:

outputting warning data warning that there is the collision possibility to the object among the objects corresponding to the response to the predetermined query.

2. The road situation data processing method according to claim 1, wherein the representing the relationship with the edge includes:

determining whether there is a collision possibility with the node corresponding to the one or more other objects among the objects based on a first location among the sensing data, a first heading direction among the sensing data, and a first speed among the sensing data of the node corresponding to any one object among the objects; and representing an edge between the node corresponding to any one object and the node corresponding to one or more other objects when the collision possibility has been determined.

3. The road situation data processing method according to claim 1, wherein the setting of the one or more previously sensed objects among the objects as the redundant object candidate includes:

determining a first spot in which the newly sensed object among the objects is located based on the sensing data on the newly sensed object among the objects;

detecting the first location data among the sensing data of the one or more previously sensed objects among the objects located within a predetermined distance from the first spot;

calculating a difference value between the second location data among the sensing data of the newly sensed object among the objects and the first location data among the sensing data of the one or more previously sensed objects among the objects located within the predetermined distance from the first spot as a first distance value; and setting the one or more previously sensed objects among the objects having the first distance value which is equal to or lower than a first threshold value as the redundant object candidate.

4. A road situation data processing apparatus, comprising:

a processor; and a memory configured to be operably connected to the processor and store at least one code executed in the processor, wherein the memory stores a code which is executed by the processor to cause the processor to receive sensing data on objects on a road from a plurality of sensors provided on the road, represent a relationship between the objects on a graph based on the sensing data on the objects from the plurality of sensors, determine a grid-based spatial index represented with respect to the relationship between the objects on the graph that have been represented, remove redundant sensing data among the sensing data on the objects from the plurality of sensors included in the grid-based spatial index, determine an object among the objects from the plurality of sensors corresponding to a response to a predetermined query by performing the predetermined query on the objects from which the redundant sensing data is removed, and output context awareness data to the object corresponding to the response to the predetermined query, wherein the memory stores a code which causes the processor to, when the graph representing the relationship between the objects on the graph, represent each of the objects on the graph as any one node and set the relationship between nodes based on whether a node corresponding to any one object among the objects affects a node corresponding to one or more other objects, and represent the relationship with an edge, wherein a plurality of attributes of the edge includes an edge ID that represent a graph edge identifier, a time to collision (TTC) that indicate an expected time to collide, and/or a deadline that indicate a limit time to necessarily transmit the context awareness data to a node connected with the edge base on the TTC, wherein the memory stores a code which causes the processor to, when the redundant sensing data from the plurality of sensors is removed, set one or more previously sensed objects among the objects as a redundant object candidate by comparing second location data among the sensing data of a newly sensed object among the objects in any one cell among a plurality of cells which configures the grid-based spatial index and first location data among the sensing data of the one or more previously sensed objects among the objects included in the any one cell and cells adjacent to the any one cell, determine the redundant object candidate as a final redundant object by comparing first trajectory data among the sensing data of the redundant object candidate and second trajectory data among the sensing data of the newly sensed object among the objects, and remove one of the sensing data of the final redundant object and the sensing data of the newly sensed object among the objects, and wherein the memory stores a code which causes the processor to, when the one or more previously sensed objects among the objects is set as the redundant object candidate, detect a first cell in which the newly sensed object among the objects is located, among the plurality of cells which configures the grid-based spatial index, based on the sensing data of the newly sensed object among the objects, detect the first location data of the one or more previously sensed objects among the objects located in the first cell, calculate a difference value between the second location data of the newly sensed object among the objects existing in the first cell and the first location data of the one or more previously sensed objects among the objects included in the first cell or a cell adjacent to the first cell as a first distance value, and set the one or more previously sensed objects among the objects having the first distance value which is equal to or lower than a first threshold value as the redundant object candidate, wherein the determining the grid-based spatial index includes determining a size of a cell which configures the grid-based spatial index based on a sensing error for each of the plurality of sensors and a speed limit set on the road, and wherein the sensing error and the speed limit are directly proportional to the size of the cell, wherein the determining of the redundant object candidate as the final redundant object includes:

extracting a first point group located in a three-dimensional coordinate system with a first location among the sensing data, a first heading direction among the sensing data, and a first speed among the sensing data included in the sensing data of the redundant object candidate as axes during a predetermined time;

extracting a second point group located in the three-dimensional coordinate system with a second location among the sensing data, a second heading direction among the sensing data, and a second speed included in the sensing data of the newly sensed object among the objects as axes during the predetermined time;

calculating a difference value between the first point group and the second point group as a second distance value; and determining the redundant object candidate having the second distance value which is equal to or lower than a second threshold value as the final redundant object, wherein the extracting of the object among the objects corresponding to the response to the predetermined query includes;

performing continuous queries identifying whether there is a first object among the objects having a collision possibility which is equal to or higher than a threshold value, with respect to objects for which the sensing data is updated in a predetermined unit of time; and determining the first object among the objects having the collision possibility which is equal to or higher than the threshold value as the object among the objects which corresponds to the response to the predetermined query as the result of the continuous queries, wherein the extracting of the object among the objects corresponding to the response to the predetermined query includes:

performing continuous queries identifying whether there is a first object among the objects having a collision possibility which is equal to or higher than a threshold value, with respect to objects for which the sensing data is updated in a predetermined unit of time; and determining the first object among the objects having the collision possibility which is equal to or higher than the threshold value as the object among the objects which corresponds to the response to the predetermined query as the result of the continuous queries;

and wherein the outputting of the context awareness data includes:

outputting warning data warning that there is the collision possibility to the object among the objects corresponding to the response to the predetermined query.

* * * * *